United States Patent
Carbines

(10) Patent No.: US 6,335,510 B1
(45) Date of Patent: Jan. 1, 2002

(54) WELDING ROBOT

(76) Inventor: Peter Carbines, 12 William Donnelly Terrace, Waikowhai, Auckland (NZ)

( * ) Notice: Subject to any disclaimer, the term of this patent is extended or adjusted under 35 U.S.C. 154(b) by 0 days.

(21) Appl. No.: 09/416,537

(22) Filed: Oct. 12, 1999

(30) Foreign Application Priority Data

Oct. 9, 1998  (NL) .................................................. 332251

(51) Int. Cl.$^7$ ................................................. B23K 9/12
(52) U.S. Cl. ......................... 219/125.1; 439/12; 901/42
(58) Field of Search ......................... 219/125.1, 125.11, 219/137.31, 86.25; 901/42; 439/12

(56) References Cited

U.S. PATENT DOCUMENTS

| 4,348,575 A | * | 9/1982 | Hedren et al. ............ 219/125.1 |
| 4,438,309 A | * | 3/1984 | Zimmer ................... 219/86.25 |
| 4,500,769 A |   | 2/1985 | Tincher |
| 4,507,534 A | * | 3/1985 | Kaufmann et al. ........... 901/42 |
| 4,515,521 A | * | 5/1985 | Takeo et al. .................. 901/42 |
| 5,132,513 A | * | 7/1992 | Ingwersen et al. ..... 219/137.31 |
| 5,488,215 A | * | 1/1996 | Aronsson ................. 219/86.25 |

* cited by examiner

Primary Examiner—Clifford C. Shaw
(74) Attorney, Agent, or Firm—Crowell & Moring LLP

(57) ABSTRACT

An improved welding robot has the power fed to the welding nozzle through a slip-ring assembly so that the power cable does not have to rotate as the welding nozzle rotates during a circular welding process.

3 Claims, 3 Drawing Sheets

WELDING ROBOT

BACKGROUND OF THE INVENTION

The present invention relates to improvements in welding robots, and more particularly in arc welding robots for use in inert gas metal arc welding ("MIG"), active gas metal arc welding ("MAG") and tungsten inert gas arc welding ("TIG") and variants.

Welding robots are programable machines designed to perform a variety of welding functions. Unlike welding machines that are custom built to perform a specific function, welding robots need to be designed to provide for significant freedom of movement and placement of the tip of the welding nozzle. To facilitate this freedom of movement and positioning, welding robots traditionally use a series of arms and motorised rotatable joints which when used in combination allow movement of the welding nozzle in three dimensions. The electrical current, shielding gas and welding wire are generally supplied to the welding nozzle by means of a co-axial cable.

Two disadvantages of the prior art are that movement of the robot results in wear on the coaxial cable and the co-axial cable may impinge on the robot's freedom of movement. For example, when the robot is programmed to perform circular welding the co-axial cable may have to flex to pass underneath an arm of the robot. This causes wear and damage to the cable and may restrict the movement of the robot. Such cables are often expensive to replace.

It is an object of the present invention to provide improvements in welding robots to avoid the disadvantages of the prior art by reducing the wear and tear on welding cables and to reduce the restriction of movement caused by use of co-axial welding cables or to at least provide the public with a useful choice.

BRIEF SUMMARY OF THE INVENTION

In a first aspect the present invention consists in a welding robot which includes a welding nozzle, said welding nozzle containing, or being adapted to contain, a welding electrode; an electrical slip-ring assembly with slip-rings mutually rotatable about a common concentric axis and conductively connected, or being adapted to be conductively connected, to said welding electrode; said welding nozzle being coupled to, or being adapted to be coupled to a flexible gas supply tube; said electrical slip-ring assembly being connected to, or being adapted to be connected to, an electrical power supply cable; said slip-ring assembly feeding electrical power to said welding electrode in use from said supply cable with said cable remaining in a substantially fixed position when said welding nozzle is caused to rotate about said axis.

In a second aspect the present invention consists in a welding robot which includes a welding nozzle, a welding electrode contained within said nozzle; mounting means rotatable about an axis, an electrical slip-ring assembly with slip-rings mutually rotatable about said axis, which is a common concentric axis, and conductively connected to each other and to said welding electrode, said slip-ring assembly being insulatingly mounted on said mounting means; said welding nozzle being coupled to a flexible gas supply tube; said electrical slip-ring assembly being connected to an electrical power supply cable; said slip-ring assembly feeding electrical power to said welding electrode in use from said supply cable with said cable remaining in a substantially fixed position when said welding nozzle is caused to rotate about said axis.

In a third aspect the present invention consists in a welding robot in which the power supply to the electrode is fed via a slip-ring assembly.

In a fourth aspect the present invention consists in a method of robotic arc welding which includes the step of feeding electrical current to the welding electrode via a slip-ring assembly which shares a common axis with one of the axes of rotation of the robot.

In a fifth aspect the present invention consists in a welding robot including a power cable connected or connectable to a welding electrode within a welding nozzle via a slip-ring assembly integrated with but electrically insulated from a rotatable joint of the robot and a gas tube connected to said welding nozzle.

In a sixth aspect the present invention consists in a slip-ring assembly comprising an insulating mounting member for attachment to a welding robot in use, conductive slip-rings held on the mounting member for mutual rotation about an axis which in use coincides with an axis of rotation of the robot, attachment means for an input power cable on one slip-ring, means for feeding power from the other slip-ring to the welding electrode in use, and compression means to hold the slip-rings in mutual electrical contact.

BRIEF DESCRIPTION OF THE DRAWINGS

The above gives a broad description of the present invention, a preferred form of which will now be described with reference to the accompanying drawings in which.

DETAILED DESCRIPTION OP THE PREFERRED EMBODIMENT

Figure 1:
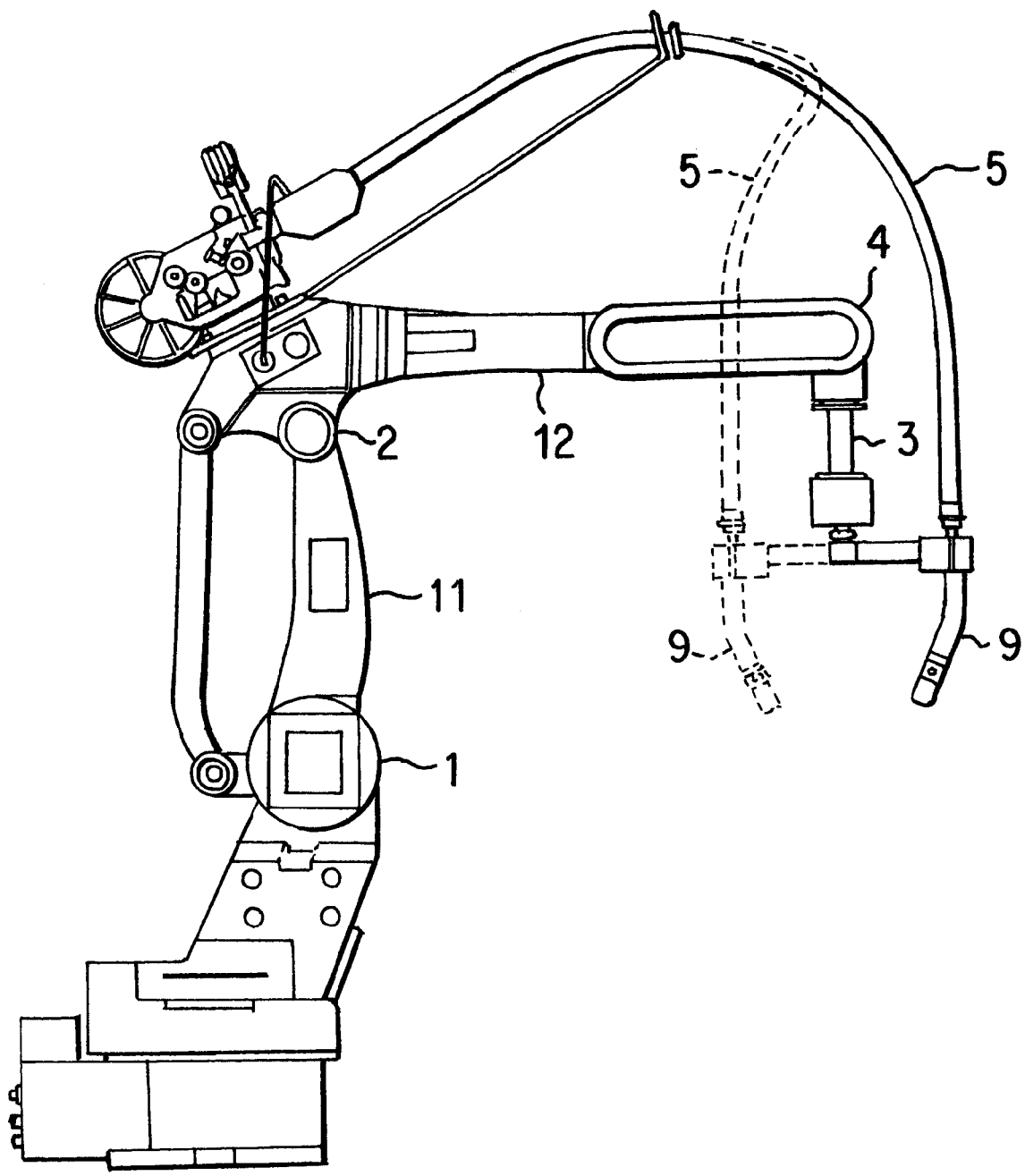
FIG. 1 shows a known welding robot; two of the possible welding nozzle positions are shown in FIG. 1 with the second position shown in dashed lines.

The prior art robot as shown in FIG. 1, has motorised rotatable joints such as 1, 2, 3 and 4 which enable the movement and the positioning of the arms 11, 12 and the welding nozzle 9 of the welding robot. The welding current and the shielding gas are supplied to the welding nozzle by means of a coaxial cable 5. Generally, a welding wire/filler will also be supplied to the welding nozzle 9 fed through the centre of the coaxial cable 5. The welding current passes from the cable to a non-consumable welding electrode, or perhaps the filler wire, in the welding nozzle. When the welding robot is in use and the welding nozzle and electrode are placed in proximity to a material to be welded, the current arcs from the electrode or wire to the material, melting the material and any welding wire/filler in proximity to the arc. In MIG and MAG welding the electrode may be consumable and consist of the welding wire.

The co-axial cable is connected at one end to sources of electricity, shielding gas, and welding wire. As shown in FIG. 1, the other end of the cable is connected to a welding nozzle.

A disadvantage of the prior art robot is that movement of the robot results in wear on the coaxial cable. This is particularly noticeable as a result of the rotation of rotating joint 3 as shown in FIG. 1. For example, when the robot is programmed to perform circular welding operations involving actuation of joint 3 and rotation of the welding nozzle, the co-axial cable 5 must flex to pass underneath the second arm 12 of the robot. This causes wear and damage to the cable and may restrict the movement of the robot. Such co-axial cables are often expensive to replace.

Figure 2:
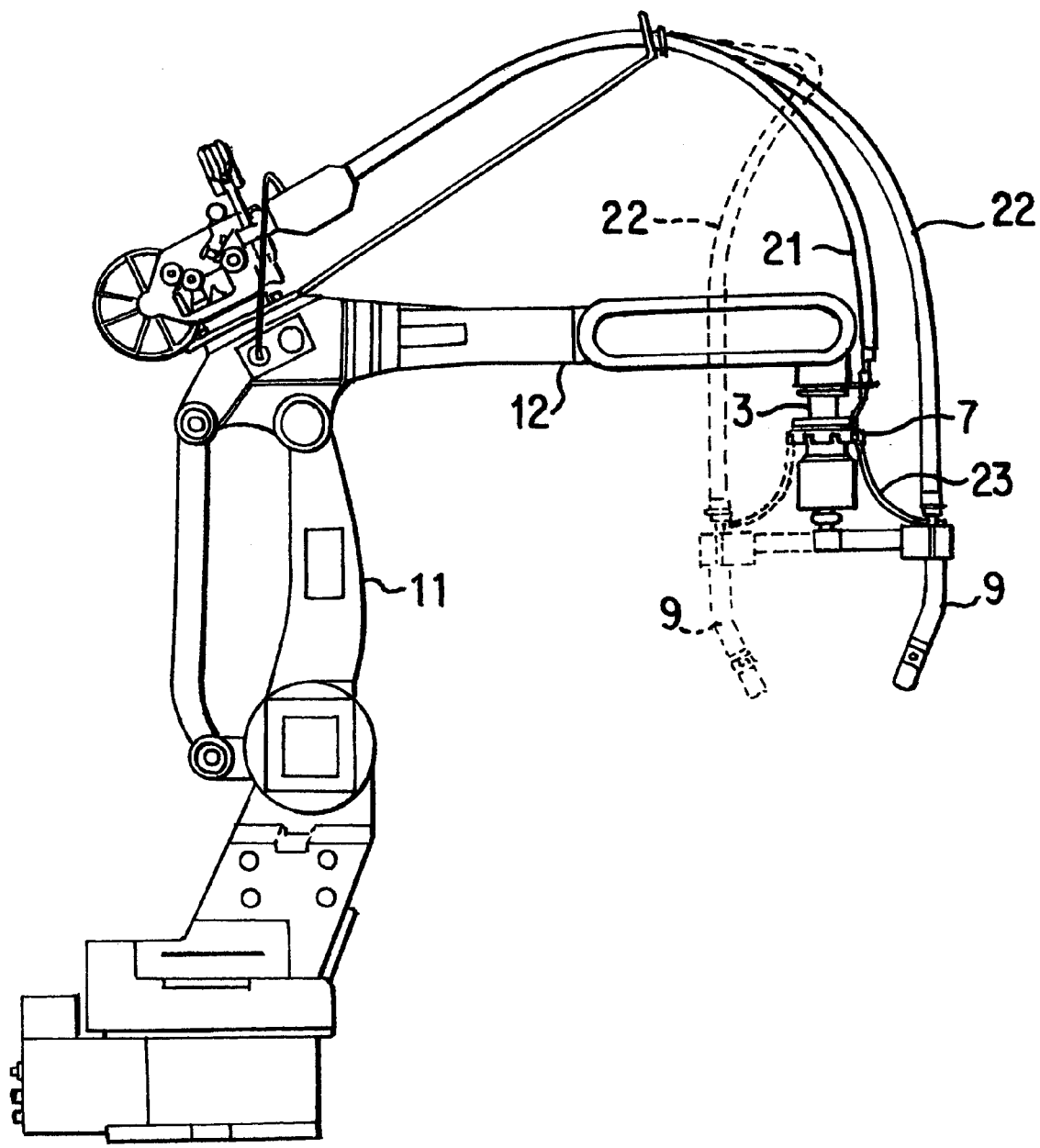
FIG. 2 shows a preferred form of a welding robot according to the present invention also with two of the possible welding nozzle positions shown and FIG. 3 shows an exploded view of a preferred form of a slip-ring assembly according to the present invention.

In the preferred form of the invention as shown in FIG. 2, power cables 21, 23 are used to supply current to the welding nozzle 9. A separate flexible rubber gas tube 22, that preferably has a wire liner and is preferably capable of carrying a welding wire in addition to shielding gas, is attached to the welding nozzle 9. The first power cable 21 is connected co a slip-ring assembly 7 integrated with rotating joint 3. The slip-ring assembly is insulated to prevent current passing from the power cable to the structure of the robot. The second power cable 23 connects from the slip-ring assembly to the welding nozzle 9.

When joint 3 is actuated to rotate the welding nozzle around the axis of joint 3, only the gas tube is flexed. No significant flexing occurs in the power cable. Because the gas tube will generally be more flexible than the co-axial cable used in the prior art, it will flex more freely against the second arm of the robot if the welding application requires the movement of the welding nozzle to positions that would cause the gas tube to encounter the robot's arm e.g. in circular welding operations.

Figure 3:
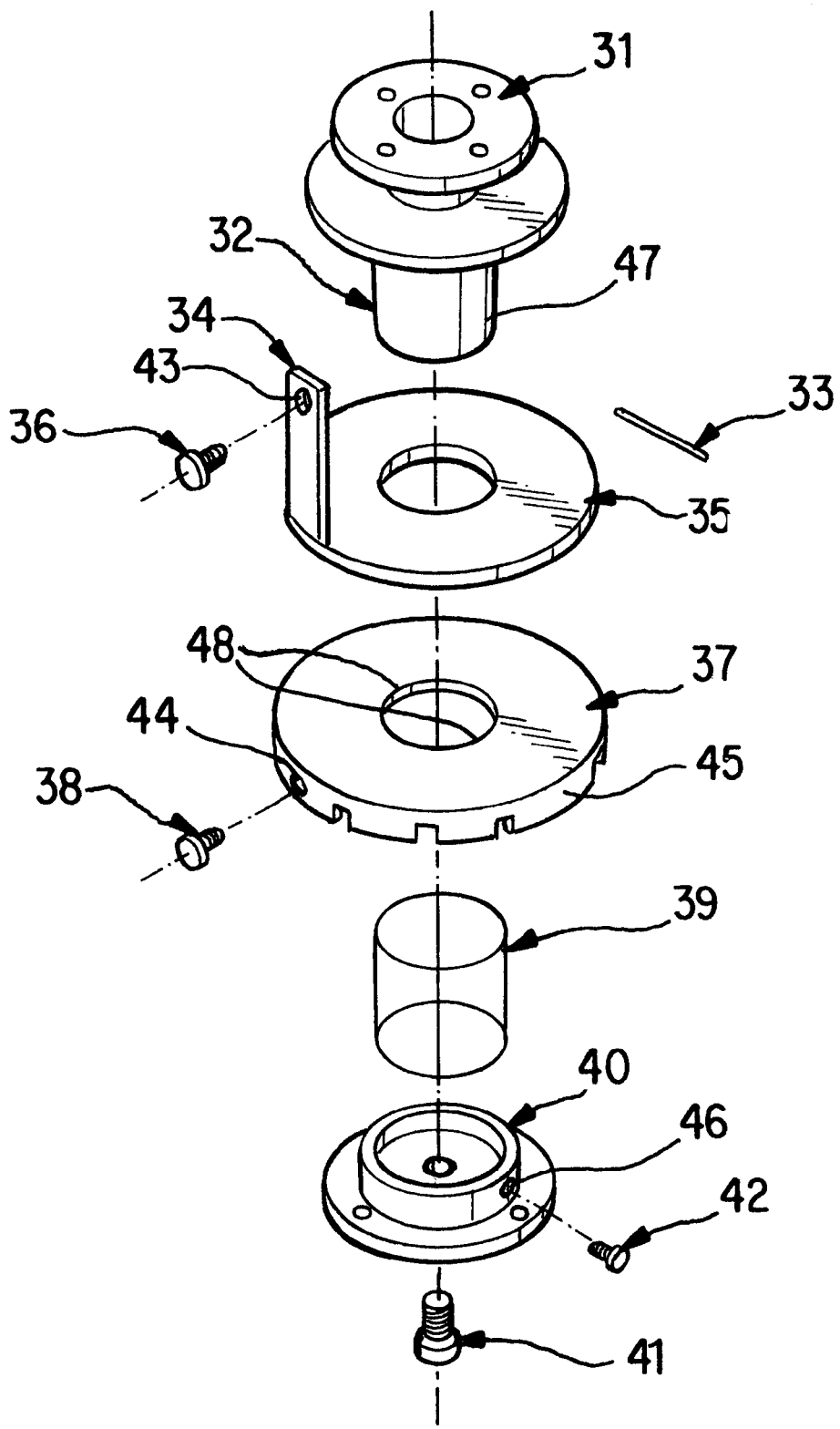

FIG. 3 shows an 'exploded' view of a preferred form of a slip-ring assembly for use in the robot arm of the present invention. A first nylon flanged component 31, (at the upper end of the slip-ring assembly 7 as seen in FIG. 2), is attachable to the robot. The first flanged component 31 has a cylindrical protrusion 32 on which other components of the slip-ring assembly are mounted. The protrusion defines an axis about which the slip-rings can rotate and is concentric with the axis of joint 3.

The electrically live components of the slip-ring assembly are thus electrically isolated from the robot arm.

The incoming welding power supply from power cable 21, (seen in FIG. 2), is conductively connectable to a copper lug 34 attached to a first brass slip-ring 35. The lug 34 and slip-ring 35 are thus electrically conductive. The power cable 21 may be connected to the lug by means of a screw 36 mounted in a suitably threaded hole 43 in the-free end of the lug.

A second electrically conductive brass slip-ring 37 has a connection point to which the second power cable 23, (seen in FIG. 2), is to be connected. The connection point may be provided by a screw 38 mounted in a threaded hole 44 in the outer periphery of the second slip-ring.

The slip-rings have surfaces which are in electrical contact when the slip-ring assembly is assembled. In the preferred embodiment of the slip-ring assembly shown in FIG. 3 the contact surfaces are flat annular surfaces.

The slip-rings are biased toward one another by a compression spring 39 (shown schematically) which provides the contacting surfaces with contact pressure. The compression spring may be a stainless steel helical coil spring.

The slip-rings may have cooling fins or cooling skirts to increase the surface area exposed to ambient air to help dissipate heat from the slip-rings. The second slip-ring 37 is shown in FIG. 3 with cooling fins provided by a slotted cylindrical cooling skirt 45 extending from the outer circumference of the slip-ring.

The welding nozzle 9, (seen in FIG. 2), is attachable to a second nylon flanged component 40, (at the lower end of the slip-ring assembly 7 as shown in FIG. 2). When the slip-ring assembly is assembled, the second flanged component 40 is fitted to the end of the protrusion 32 and retained by a fastener such as the radial screw 42 coacting with holes 46 and 47. Screw 41 coacts with a threaded hole in component 31 to allow easy assembly.

When the components of the slip-ring assembly are assembled, the slip-rings are retained between the flanged components and remain in electrical contact while being freely rotatable with respect to each other about the axis provided by the protrusion 32. However a bracket (not shown) coacts with the lug 34 and the robot and prevents substantial rotation of the slip-ring 35. Also pin 33 passes through a diametrical hole (not shown) in the protrusion 32 in a position where its ends can be engaged by notches 48 to effect positive drive of the lower slip-ring 37 as the robot effects rotation about joint 3. The notches are deep enough to allow axial movement of slip-ring 37.

Thus the preferred form of the present invention may reduce the restrictions of movement of the welding robot by eliminating the stiff coaxial cable of the prior art. Because the power cable and gas tubing will generally be cheaper than co-axial cable, the preferred form of the present invention is also likely to reduce the cost of producing welding robots and because only the gas tube is required to flex in use, maintenance costs for replacement componentry should also be reduced.

What I claim is:

1. A welding robot comprising a welding nozzle, said welding nozzle containing a welding electrode; an electrical slip-ring assembly with slip-rings mutually rotatable about a common concentric axis, maintaining electrical contact during rotation, and being conductively connected to said welding electrode; said welding nozzle being coupled to a flexible gas supply tube; said electrical slip-ring assembly being connected to an electrical power supply cable; wherein said slip-ring assembly feeds electrical power to said welding electrode, in use, from said supply cable with said cable remaining in a substantially fixed position when said welding nozzle is caused to rotate about said axis.

2. A welding robot comprising a welding nozzle, a welding electrode being contained within said nozzle; a mount rotatable about an axis, an electrical slip-ring assembly with slip-rings mutually rotatable about said axis, which is a common concentric axis, and being conductively connected to each other during rotation and to said welding electrode, said slip-ring assembly being insulatingly mounted on said mount; said welding nozzle being coupled to a flexible gas supply tube; said electrical slip-ring assembly being connected to an electrical power supply cable; wherein said slip-ring assembly feeds electrical power to said welding electrode, in use, from said supply cable with said cable remaining in a substantially fixed position when said welding nozzle is caused to rotate about said axis.

3. A slip-ring assembly comprising an insulating mounting member for attachment to a welding robot, conductive slip-rings being held on the mounting member for mutual rotation about an axis which in use coincides with an axis of rotation of the robot, an attachment for attaching an input power cable on one slip-ring, a power feed for feeding power from the other slip-ring to the welding electrode in use, and a compression bias to hold the slip-rings in mutual electrical contact during rotation.

* * * * *